(12) United States Patent
Goyal et al.

(10) Patent No.: US 10,404,631 B2
(45) Date of Patent: Sep. 3, 2019

(54) CREATING GROUPS IN A MESSAGING SYSTEM

(71) Applicant: Microsoft Technology Licensing, LLC, Redmond, WA (US)

(72) Inventors: Teekam Chand Goyal, Hyderabad (IN); Nitin Jaiswal, Hyderabad (IN); Rajiv Kumar, Hyderabad (IN); Prashant Gupta, Hyderabad (IN); Deepak Pratinidhi, Hyderabad (IN); Arun Rajappa, Hyderabad (IN); Apoorv Seth, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 15/467,894

(22) Filed: Mar. 23, 2017

(65) Prior Publication Data
US 2018/0205676 A1    Jul. 19, 2018

(30) Foreign Application Priority Data
Jan. 13, 2017  (IN) .............................. 201741001493

(51) Int. Cl.
*H04L 12/58*   (2006.01)
*H04L 29/08*   (2006.01)
(Continued)

(52) U.S. Cl.
CPC ............ *H04L 51/04* (2013.01); *H04L 12/185* (2013.01); *H04L 51/14* (2013.01); *H04L 67/306* (2013.01); *H04W 4/08* (2013.01)

(58) Field of Classification Search
None
See application file for complete search history.

(56) References Cited

U.S. PATENT DOCUMENTS

| 6,671,695 B2 | 12/2003 | McFadden |
| 7,428,750 B1 | 9/2008 | Dunn et al. |

(Continued)

FOREIGN PATENT DOCUMENTS

| WO | 2007047140 A1 | 4/2007 |
| WO | 2016003852 A1 | 1/2016 |

OTHER PUBLICATIONS

"Managing your Yammer (Yammer Admin Guide) Office 365", https://support.office.com/en-us/article/Managing-your-Yammer-users-Yammer-admin-guide-0fc72b66-cbf1-4202-bcf0-f2174ea96798, Retrieved on: Dec. 9, 2016, 6 pages.

(Continued)

*Primary Examiner* — Angela Nguyen
(74) *Attorney, Agent, or Firm* — Michael Best & Friedrich LLP

(57) ABSTRACT

A messaging system comprising: computer storage holding messaging accounts for users of the messaging system, each comprising a user identifier of a first type; an account manager for managing the messaging accounts; a group manager configured to grant participant users access to messaging groups by creating, in the computer storage, associations between the messaging groups and the messaging accounts of the participant users; a group messaging service configured for use in transmitting and receiving messages, in each of the plurality of messaging groups, between the participant users granted access to that messaging group, using the user identifiers of the first type in their messaging accounts.

20 Claims, 5 Drawing Sheets

(51) Int. Cl.
  *H04L 12/18* (2006.01)
  *H04W 4/08* (2009.01)

(56) References Cited

U.S. PATENT DOCUMENTS

| | | |
|---|---|---|
| 8,020,105 B1 | 9/2011 | Lemay et al. |
| 9,092,637 B2 | 7/2015 | Mathew et al. |
| 9,342,852 B1 | 5/2016 | Nagaraj et al. |
| 9,426,191 B2 | 8/2016 | Castanho et al. |
| 2008/0186926 A1* | 8/2008 | Baio ................. G06Q 30/02 370/338 |
| 2008/0316925 A1 | 12/2008 | Dolin et al. |
| 2010/0217805 A1 | 8/2010 | Lavoie et al. |
| 2012/0079023 A1 | 3/2012 | Tejada-gamero et al. |
| 2013/0144951 A1 | 6/2013 | Viswanath et al. |
| 2013/0185285 A1* | 7/2013 | Shuman ........... G06F 17/30554 707/722 |
| 2013/0204888 A1 | 8/2013 | Guzman suarez et al. |
| 2014/0046802 A1* | 2/2014 | Hosein ............... G01R 1/06711 705/26.61 |
| 2014/0137191 A1* | 5/2014 | Goldsmith .............. H04L 63/08 726/3 |
| 2015/0113631 A1 | 4/2015 | Lerner et al. |
| 2015/0348052 A1 | 12/2015 | Rekhi et al. |
| 2016/0125368 A1 | 5/2016 | Grassadonia et al. |
| 2016/0174064 A1 | 6/2016 | Brinskele |

OTHER PUBLICATIONS

"How to Edit Ghost User Profile—Ghost Tutorial—FastComet", http://www.fastcomet.com/tutorials/ghost/edit-user-profile, Retrieved on: Dec. 13, 2016, Published on: 2012, 4 pages.

"International Search Report and Written Opinion Issued in PCT Application No. PCT/US2018/012443", dated Mar. 6, 2018, 12 Pages.

* cited by examiner

CREATING GROUPS IN A MESSAGING SYSTEM

RELATED APPLICATIONS

This application claims priority under 35 U.S.C. 119 or 365 to Indian Patent Application No. 201741001493 filed Jan. 13, 2017, the disclosure of which is hereby incorporated by reference in its entirety.

TECHNICAL FIELD

The present invention pertains to a messaging system for use in transmitting and receiving messages between users via a network.

BACKGROUND

A messaging (chat) system allows users of the messaging system to exchange messages with other users of the messaging system. The messages are primarily text-based, but can also comprise rich content such as images, videos, documents, audio etc. This is sometimes referred to as instant messaging, which refers to the fact that the messaging takes place in real time. That is, there is typically only a short delay (e.g. about two seconds or less) between a user sending a message and it being received by its intended recipient(s). The messages are transmitted and received via a network, for example a packet-based network such as the Internet.

Other rich functionality, such as collaborative documents editing, poll creation etc. may also be provided within the messaging system.

The users have messaging accounts held within the messaging system and which they use to access the messaging system.

Within the messaging system, users may be able to create messaging groups. Multiple users, often more than two users, may be participants in a messaging group. The participant's messaging accounts are associated with the messaging group, which provides a convenient means by which those users can communicate with each other using a messaging service of the messaging system. For example, the messaging service may comprise a messaging server which relays messages between users in the group, or a look up server which allows network addresses of the users to be obtained so that messages can be sent between them directly etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect of the present invention, a messaging system comprises: computer storage holding messaging accounts for users of the messaging system, each comprising a user identifier of a first type; an account manager for managing the messaging accounts; a group manager configured to grant participant users access to messaging groups by creating, in the computer storage, associations between the messaging groups and the messaging accounts of the participant users; a group messaging service configured for use in transmitting and receiving messages, in each of the plurality of messaging groups, between the participant users granted access to that messaging group, using the user identifiers of the first type in their messaging accounts.

The group manager is configured to receive group creation data comprising at least one set of user identifiers of a second type denoting a new messaging group to be created, and create in response a new messaging group by storing the set of user identifiers in the computer storage as placeholder identifiers for the new messaging group.

The account manager is configured to receive, from a user of one of the messaging accounts, an indication of a user identifier of the second type to be bound to that messaging account, and respond by binding that user identifier to that messaging account in the computer storage.

The group manager is configured to detect a match between one of the placeholder identifiers and the user identifier of the second type bound to the messaging account, and respond by creating, in the computer storage, an association between that messaging account and the new messaging group, thereby granting the user access to that messaging group, wherein the new messaging group is inaccessible to the user until the user identifier of the second type is bound to his messaging account.

This provides a flexible and convent means of creating new messaging groups, particularly large groups and/or with complex group hierarchies, without needing to know the identities of the participants within the messaging system (i.e. without needing to know the user identifiers of the first type).

According to a second aspect disclosed herein, there is provided a computer system comprising: a messaging system according to the first aspect; and an organization management system comprising: second computer storage holding member accounts for members of an organization, each of the member accounts comprising a user identifier of the second type.

In embodiments, the computer system further comprises: an organization administrator interface configured for use by an administrator of the organization, wherein the group creation database is received by the organization administrator via the organization administrator interface.

In embodiments, the binding of the user identifier of the second type to the messaging account is conditional on the group manager receiving, from the organization management system, confirmation that the user is an authorized user of one of the member profiles comprising that user identifier of the second type.

In embodiments, the group creation data defines multiple new messaging groups to be created, wherein multiple new messaging groups are created using placeholder identifiers.

In embodiments, at least one of the placeholder identifiers identifies a participant in a plurality of the new messaging groups, wherein the group manager is configured to detect a match between that placeholder identifier and the user identifier of the second type bound to the messaging account, and respond by creating, in the computer storage, an association between that messaging account and each of the plurality of new messaging groups, thereby granting the user access to all of the plurality of new messaging groups simultaneously.

In embodiments, the group creation data defines a hierarchical structure for the multiple new messaging groups, in which at least one of the new messaging groups is a participant of at least one other of the messaging groups.

In embodiments, the first type of user identifiers are phone numbers.

In embodiments, the second type of user identifiers are email addresses.

According to a third aspect disclosed herein, there is provided a method of managing a messaging system comprising: computer storage holding messaging accounts for users of the messaging system, each comprising a user identifier of a first type; and a group messaging service for use in transmitting and receiving messages, in each of the plurality of messaging groups, between participant users granted access to that messaging group, using the user identifiers of the first type in their messaging accounts; the method comprising steps of: granting participant users access to messaging groups by creating, in the computer storage, associations between the messaging groups and the messaging accounts of the participant users; receiving group creation data comprising at least one set of user identifiers of a second type denoting a new messaging group to be created; creating, in response to receiving said group creation data, a new messaging group by storing the set of user identifiers in the computer storage as placeholder identifiers for the new messaging group; receiving, from a user of one of the messaging accounts, an indication of a user identifier of the second type to be bound to that messaging account; binding, in response to receiving said indication, that user identifier to that messaging account in the computer storage; detecting a match between one of the placeholder identifiers and the user identifier of the second type bound to the messaging account; in response to detecting said match, creating, in the computer storage, an association between that messaging account and the new messaging group, thereby granting the user access to that messaging group, wherein the new messaging group is inaccessible to the user until the user identifier of the second type is bound to his messaging account.

In embodiments, the messaging system further comprises: an organization management system comprising a second computer storage holding member accounts for members of an organization, each of the member accounts comprising a user identifier of the second type.

In embodiments, the messaging system further comprises: an organization administrator interface configured for use by an administrator of the organization, wherein the group creation database is received by the organization administrator via the organization administrator interface.

In embodiments, the binding of the user identifier of the second type to the messaging account is conditional on receiving, from the organization management system, confirmation that the user is an authorized user of one of the member profiles comprising that user identifier of the second type.

In embodiments, the group creation data defines multiple new messaging groups to be created, wherein multiple new messaging groups are created using placeholder identifiers.

In embodiments, at least one of the placeholder identifiers identifies a participant in a plurality of the new messaging groups, wherein the method further comprises: detecting a match between that placeholder identifier and the user identifier of the second type bound to the messaging account, and respond by creating, in the computer storage, an association between that messaging account and each of the plurality of new messaging groups, thereby granting the user access to all of the plurality of new messaging groups simultaneously.

In embodiments, the group creation data defines a hierarchical structure for the multiple new messaging groups, in which at least one of the new messaging groups is a participant of at least one other of the messaging groups.

In embodiments, the first type of user identifiers are phone numbers.

In embodiments, the second type of user identifiers are email addresses.

According to a fourth aspect disclosed herein, there is provided a computer program product for managing a messaging system comprising: computer storage holding messaging accounts for users of the messaging system, each comprising a user identifier of a first type; and a group messaging service for use in transmitting and receiving messages, in each of the plurality of messaging groups, between participant users granted access to that messaging group, using the user identifiers of the first type in their messaging account; the computer program product comprising computer-executable code embodied on a computer-readable storage medium configured to as when executed by one or more processing units to perform steps of: granting participant users access to messaging groups by creating, in the computer storage, associations between the messaging groups and the messaging accounts of the participant users; receiving group creation data comprising at least one set of user identifiers of a second type denoting a new messaging group to be created; creating, in response to receiving said group creation data, a new messaging group by storing the set of user identifiers in the computer storage as placeholder identifiers for the new messaging group; receiving, from a user of one of the messaging accounts, an indication of a user identifier of the second type to be bound to that messaging account; binding, in response to receiving said indication, that user identifier to that messaging account in the computer storage; detecting a match between one of the placeholder identifiers and the user identifier of the second type bound to the messaging account; in response to detecting said match, creating, in the computer storage, an association between that messaging account and the new messaging group, thereby granting the user access to that messaging group, wherein the new messaging group is inaccessible to the user until the user identifier of the second type is bound to his messaging account.

In embodiments, the messaging system further comprises: an organization management system comprising second computer storage holding member accounts for members of an organization, each of the member accounts comprising a user identifier of the second type.

BRIEF DESCRIPTION OF FIGURES

For a better understanding of the present invention, and to show how embodiments of the same may be carried into effect, reference is made to the following figures in which.

DETAILED DESCRIPTION OF EXAMPLE EMBODIMENTS

Figure 1:
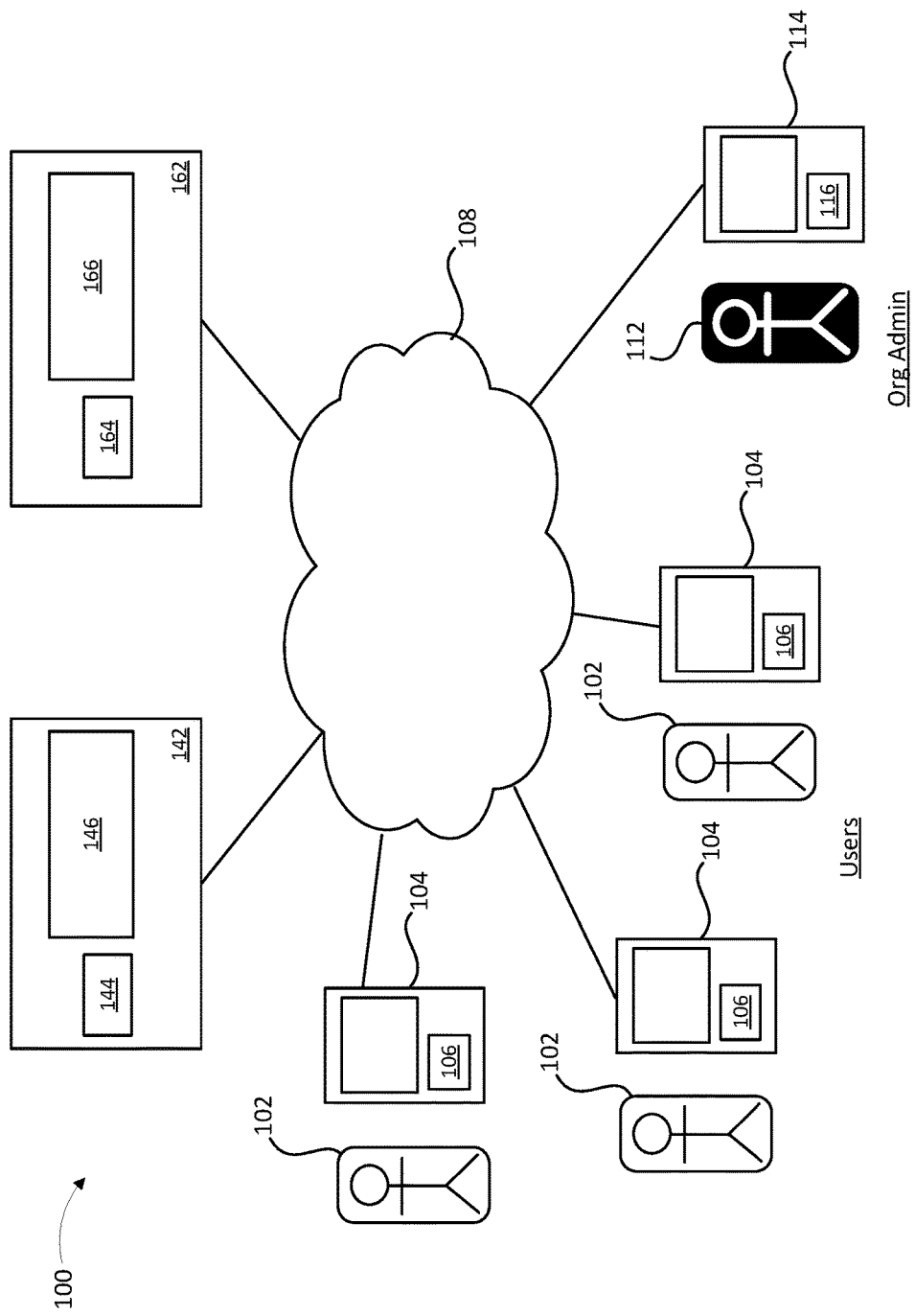
FIG. 1 shows a schematic block diagram of a computer system comprising a messaging system and an organization management system.

The described embodiments provide a messaging (chat) system, in which each user's identity is associated with a messaging account comprising a first type of user identifier (ID)—a phone number in the examples described. The first type of user ID is used to allow messages to be transmitted and received between the users of the messaging system, between user devices associated with the user IDs of the first type, such as mobile phones. Users can form messaging groups, such that any user participating in a messaging group can transmit and receive messages to/from all other user(s) in the messaging group.

Within an organization (org) managements system (organizational system/org subscription system), such as Office 365 (O365), users have member accounts comprising a second type of user ID. That is, users of the org management system are instead identified by a second type of user ID—an email address in the examples described. These user IDs of the second type are not directly compatible with the messaging system, and cannot be used within the messaging system as a basis for transmitting and receiving messages as such.

However, messaging groups can be created within the messaging system, preferably in bulk, using the second type of user ID (email) to define participants of each messaging group—even though those user IDs of the second type are incompatible with the messaging system. Within the messaging system, these second type of user IDs act as "placeholder" IDs initially, in that the participants cannot access the messaging groups at this point. It is down to each individual participant to bind their second type of user ID (email) with their messaging account in order to gain access to the messaging group.

In particular, this enables large organizations (e.g. corporations, governments etc.) to manage and organise complex group structures, with potentially thousands of users overall, using the email addresses from their own org management system without requiring them to know the user's mobile numbers.

An administrator (admin) of the organisation uses an organization admin interface, which is a web portal linked to the messaging system service to upload group creating data, defining the group structures to be created in terms of email addresses.

A method is performed at the messaging system that uses first identifier type information (a mobile/cell phone number) to identify active-type user profiles within the messaging service, in which an administrator uploads organisation information (org info/group creation data) to the message service, wherein the org info contains a hierarchy of second identifier type (O365 user identifier) information. An automated service (group manager) creates a plurality of inactive-type profiles each related to second identifier type information, wherein an inactive-type profile is not visible to a user of the messenger service. The group manager creates a group structure of the inactive-type profiles according to the hierarchy within the org info. The group manager monitors user information for active-type user profiles that contain second identifier type information that match that in an inactive-type profile. If so, an active-type profile and an inactive-type profile that contains matching information are merged. The merger profile is an active-type and is within the group structure, such that the user of that profile can now participate in that group as a consequence.

FIG. 1 shows a highly schematic block diagram of a computer system 100 comprising a messaging system 142, an organizational system 162, a plurality of first user devices 104 operated by a plurality of first users 102 respectively and a second user device 114 operated by a second user 112. The systems and devices 104, 114, 142, 162 are shown connected to a network 108, which is a packet-based computer network such as the Internet.

The first users 102 are users of both the messaging system 142 and the organizational system 162, and all descriptions pertaining to the first user device 104 and the first user 102 below applies equally to each such user.

The user devices 104, 114 comprise respective processors 106, 116, such as a central processing unit (CPU) or CPUs, for executing instructions stored in memory of the user device 104/114 (not shown) so as to carry out functions embodied in those instructions.

The processor 106 of the first user device 104 is configured to execute at least two applications: a messaging application and a management application (not shown), which comprise respective instructions that when executed on the processor 106 cause the user device 104 to establish respective connections via the network 108 with the messaging system 142 and organizational system 162 respectively, thereby allowing the user 102 to access services provided by those systems from his user device 104.

The processor 116 of the second user device 114 is configured to execute an application, such as a web browser, so that the user 112, who is an organization administrator within the organizational system 162, can access an org admin interface (202, FIG. 2), which is a web portal. That is, the computer system 100 comprises the org admin interface 202, which is accessible to the org admin 112 using his user device 114.

The messaging system 142 comprises at least one processor 144, such as a CPU or CPUs, and first computer storage 146 accessible to the at least one processor 144. The at least one processor 144 is configured to execute message system code (not shown) stored in the first computer storage 146 in order to implement the functionality of the messaging system 142 that is described below. In particular, the messaging code implements, when executed, a group messaging service (204, FIG. 2), an authentication function (205, FIG. 2), an account manager (207, FIG. 2) and a group manager (209, FIG. 2) that are described later.

The organizational system 162 also comprises at least one processor 164, such as a CPU or CPUs, and second computer storage 166 accessible to the at least one processor 164. The at least one processor 164 is configured to execute management code (not shown) stored in the second computer storage 166 in order to implement the functionality of the organizational system 162 described below. In particular, the management code, when executed, implements an authentication function (203, FIG. 2) and one or more organization management services (212, FIG. 2).

The user devices 104, 114 also comprise respective displays (not shown) which can be controlled to display information communicated to the devices by the systems 142, 162, thereby outputting that information to the user 102/112 in question.

Figure 2:
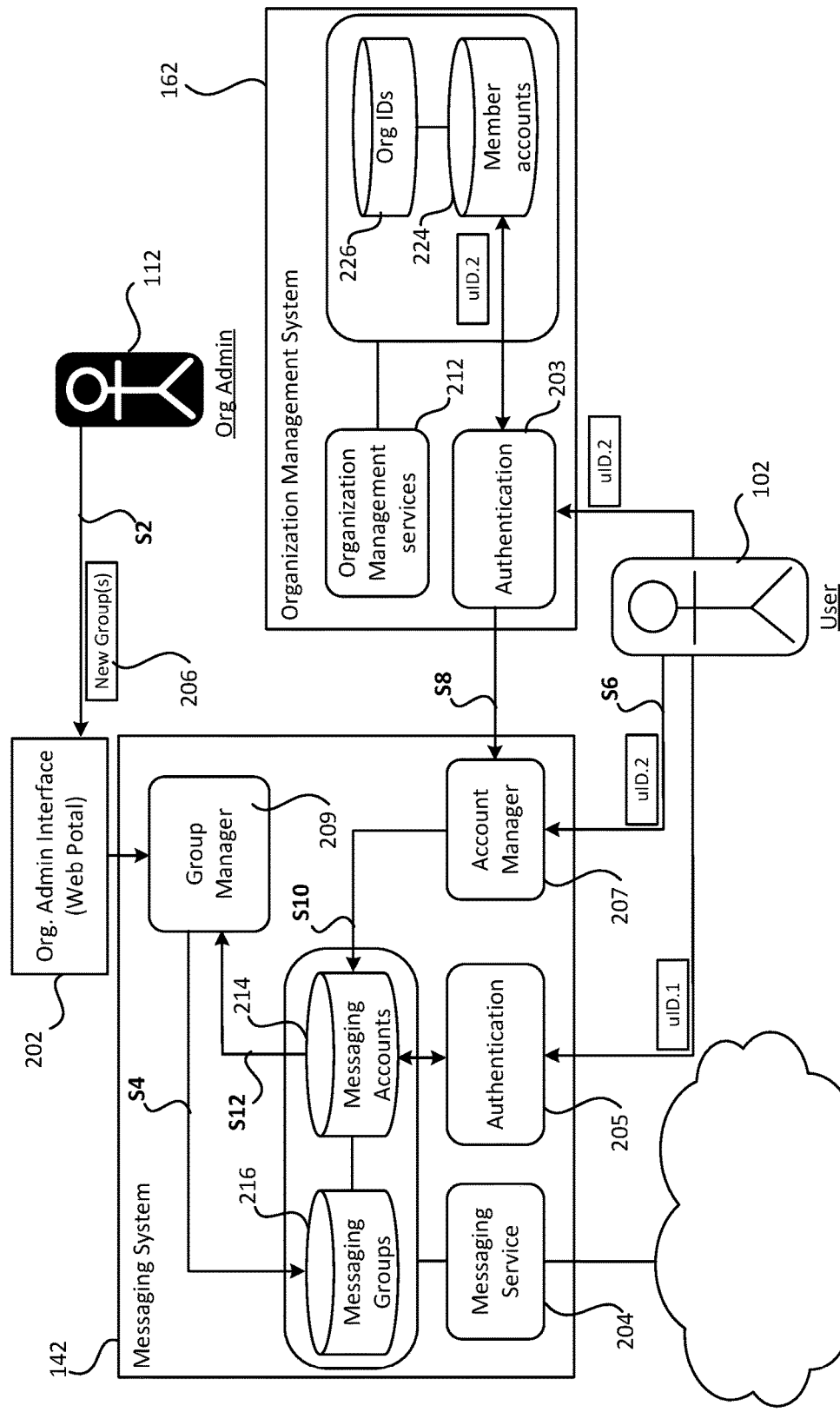
FIG. 2 shows a schematic functional block diagram for the computer system

With reference to FIG. 2, the two systems 142, 162 have independent user account infrastructure, wherein users can create separate and independent user accounts with the two systems 142, 162.

Within the messaging system 142, user accounts 214 are created and stored in the first computer storage 146. User accounts within the messaging system 142 are referred to as messaging accounts. Each messaging account 214 comprises user data of its user, such as a user credential(s) and other information pertaining to the user in the context of the messaging system 142. In particular, each messaging account 214 comprises a user identifier of a first type— denoted uID.1 in the figures—which is used to identify the user of that account within the messaging system 142 and is a mobile number in the following examples. In other words, within the messaging system 142, each user has a primary identity, which is their mobile number uID.1, and which they are required to have in order to use the system.

The messaging accounts 214 are created and managed by the account manager 207 of the messaging system 142, which can for example provide a web interface via which a user can create a messaging account using an instance of the messaging application executed on his user device, such as devices 104/114.

Within the organizational system 162, user accounts 224 are created and stored in the second computer storage 166. User accounts in the organizational system 162 are referred to as member accounts, belonging as they do to members of an organization managed by the system 162. Each comprises a user identifier of a second type—denoted uID.2 in the figures—which is used to identify that user within the org system 162, and which is an email address in the following examples.

The member accounts 224 are created by a registration service of the organizational system 162 (not shown), which can for example provide a web interface for creating messaging accounts, using the management application, for example on device 104.

The org subscription system 162 is separate from the messaging system 142, and is operated and managed independently.

For example, the messaging system 142 and the organizational system 162 have separate and independent authentication functions—205, 203 respectively—for authenticating users based on their messaging accounts 214 and member accounts 224 respectively. By successfully authenticating himself, the user becomes the authorized user of that account. The messaging accounts 214 and member accounts 224 are also created and managed independently, by registration services 207 and 212 respectively.

The messaging service 204 of the messaging system 142 allows authorized users of the messaging accounts 214 to transmit instant messages to and receive instant messages from other users of the messaging system. The messaging service 204 also allows those users to create messaging groups 216. Information about each messaging groups 216, such as a group identifier (grpID) and information about the users participating in that messaging group, is stored in the first computer storage 146. The messaging accounts 214 of users participating in a messaging group are associated with the messaging group (that is, with the group ID of that messaging group) in the first computer storage 146. Based on this group information and the information in the associated messaging accounts 214, the messaging service 204 allows the group participants to exchange instant messages within the messaging group via the network 108. For example, the messages may be relayed between the participants by the messaging service, or the messaging service may provide network address information to allow the participant to exchange the messages with each other directly.

However, when the messaging service 204 is implemented, the first type of user identifiers uID.1 are used as a basis for the exchange of messages in each messaging group, for example by identifying user devices 104 associated with the first type of user identifiers uID.1 of the users in the messaging group as recipient devices for messages in the group.

It can also provide enhanced communication functions within messaging groups, such as the communication of interactive content (polls, surveys, meeting invites, job assignments etc.), rich content (audio data, image data, file sharing etc.). Interactive content is also referred to herein as "cards", referring to the fact that options relating to the interactive content may be displayed on a card-like interface.

As noted, the organizational management system 162 provides one or more organization management services 212, to assist its users in managing their (respective) organization(s). That is, in some implementations the services 212 may be provided to a plurality of different organizations, identified by respective organization IDs 226 held in the second computer storage 166.

Such services 212 can for example include email services, e.g. business email, document sharing and collaboration, shared storage, and the provision of application software, such as word processing software, spreadsheet software etc. As example of an organizational account providing such services is O365. Organizational accounts and the types of management services 212 they can provide are known in the art, and are not discussed in further detail herein.

As indicated above, although users 102 are identified within the two systems 142, 162 using different types of user identifiers (uID.1, uID.2 respectively), in accordance with the described techniques, the org admin 112 can create new messaging groups using the second type of user ID, uID.2. It is then down to each individual user 102 to link (bind) his messaging accounts 214 in the messaging system 142 to his member account 224 in the org system 162, via the account manager 207 of the messaging system 142. Until he does so, the second type of user identifier ID.2 (email) for that user is used as a placeholder ID (also referred to as a ghost ID) to define that user's relationship to the group, even though it cannot be used as a basis for communication within the messaging system 142. For example, an inactive, ghost account can be created using uID.2, which is then merged with the user's actual messaging account 214 when he links the latter to his member account 224. The user cannot access or see the new messaging group until he has linked his accounts together.

This allows the org admin 112 to create multiple groups with many participants overall (e.g. several thousand), with potentially complex group structures (e.g. where messaging groups can themselves be members of other messaging groups and so on—see below), without needing to know the first type of user identifiers uID.1 (mobile numbers). This is less burdensome for the administrator 112, and is also beneficial for the users as they may not want to make their mobile numbers available outside of their own messaging groups for privacy reasons.

In other words, the described embodiments of the present invention address only require an org admin to upload a list of group names and corresponding org email ID (e.g. Office 365 account ID) and other optional data e.g. employee names, which is sufficient to create groups—without needing any mobile numbers. Once the admin uploads these details, this information is saved by the messaging system, effectively creating "ghost" groups of "ghost" members (identified by placeholder IDs). These are "ghost" groups and members (group participants) in the sense that the underlying grouping structure is specified, but messaging itself cannot yet take place because the primary ID (mobile number) is not yet known. These may be hidden from the users until they are activated into "full" groups and members by the provision of the missing data (described below).

This provides significant benefits with respect to existing systems: for existing messaging systems that use mobile numbers as the primary identity, to set up the grouping within such a messaging system, an admin would typically be required uploads a list of group names, employee names, and—importantly—their corresponding mobile numbers. However, in their core identity system (e.g. Office 365 Active Directory), admin may not have (up-to-date) mobile numbers for one or more employees. It is not only an operational burden to retrieve the mobile numbers, but also the identity system is often global in the organisation which means that updating the mobile number there would end up showing the number to all people in the organization. Many employees prefer not to disclose their mobile number beyond their teams, e.g. may only find it acceptable to disclose this within chat groups, as these are often private and limited to a smaller number of people.

An example process of creating messaging groups will now be described with reference to FIG. 2.

At step S2, the org admin 112 uploads group creation data 206 to the group manager 209 via the org admin portal 202. The group creation data 206 comprises at least one set of user IDs of the second type (email addresses) denoting a new group to be created, and can define multiple groups with potentially complex hierarchical structure (see below). The set of email addresses identifies which users are intended participants for the new messaging group(s).

At step S4, the group manager 209 creates a new messaging group(s), using the set of email addresses received in the group creation data 206 as placeholder identifiers for at least any participants in that group who have not already linked their messaging accounts 214 (and hence their mobile numbers uID.1) to their member accounts 224 at that time. That is, the set of email addresses are stored as placeholder IDs in the first computer storage 146 of the messaging system 142. For example, a new, unique group ID may be created for the new group 216 (or for each new group), that is stored in association with the set of placeholder IDs.

A user 102 links his messaging account 214 to his member account 224 (S6) by indicating his user identifier of the second type uID.2 to the account manager 207. In order to be allowed to link uID.2 to his messaging account 214, the account manager 207 may check that the user 102 is actually authorized to use uID.2. For example, the authentication function 203 of the org system 162 may provide (S8) information demonstrating that the user 102 is authorized to use uID.2. For example, this can require the user to log-in (or otherwise authenticate himself to) to the org system 162 using uID.2, via the authentication function 203 of the org system 162. The information can be provided from the authentication function 203 of the org system 162 directly to the messaging system 142, for example via an application programming interface (API), or alternatively the authentication function 203 can provide the user with, say, an authentication token, subject to successful authentication based on uID.2, which the user 102 can then provide to the account manager 207 to demonstrate his authorization to use uID.2. In general, any mechanism can be used for conveying, by the authentication function 203 of the org system 162 to the account manager 207 of the messaging system 142, that the user 102 is an authorized user of the member account comprising the second type of user identifier uID.2 that the user 102 wishes to bind to his messaging account 214. That is, the member account 224 comprising the user identifier of the second type uID.2 (email) as indicated by the user 102 at step S6.

Assuming the user 102 is authorized to use uID.2, then at step S10 the account manager 207 links the user's messaging account 214 to his org account 162, using the information provided at step S6. In so doing, the account manager 207 binds the second type of user identifier uID.2, indicated at step S6, to the first type of user identifier uID, in that messaging account 214, in the first computer storage 146.

At step S12, the group manager 209 detects a match between the uID.2 now bound to the messaging account 214 and a corresponding one of the placeholder identifiers stored for the new messaging group, and in response grants the user 102 of that messaging account 214 access to the new messaging group, by associating his messaging account 214 with that messaging group in the first computer storage 146. As such, the user 102 can now transmit and receive messages to/from any other users as a participant in that messaging group who have also linked their messaging accounts 214 and member accounts 224 in the same manner. In some cases, the user 102 may also be able to see messages exchanged before he joined, possibly with some resections depending on the implementation. It is only now that the new messaging group becomes accessible to that user— before his messaging account 214 and org account 224 are linked, he cannot access the new messaging group.

Note, this is not restricted to one group—where the group creation data defined multiple new messaging groups, and one user is a participant in two or more of those groups, he gains access to all of those two or more groups simultaneously upon binding his messaging account 214 to his member account 224.

Note also that whilst mobile numbers and email are used as examples of the two different types of user identifier, the present invention is not limited to this any can be applied to any user identifiers of different types.

In some cases, steps S6-S10 can be implemented using the concept of an "add-on" profile.

Within the messaging system 142, personal information in a users' messaging 214 account, where that personal information includes his mobile number uID.1, is referred to as his primary profile. An add-on profile in this context is a profile in an external system, such as a social media platform, personal account (e.g. personal email) etc. That is, the account manager 207 can provide a generic add-on profile function, which can be used to link the user's primary profile to a variety of external profiles as he chooses. This generic add-on profile function can be used at steps S6-S10, where the external profile in this context is personal information (including his email uID.2) in his member account 224 of the org management system 162 (member profile), that the user 102 links to his messaging account 214. Once so linked, the member profile becomes an add-on profile to the primary profile, thereby binding the primary profile to the users' email uID.2 for detection at step S12.

In this context, each of placeholder identifiers stored at step S4 constitutes a "ghost profile" (also referred to as an inactive-type profile) within the messaging system, until such time as the user links the corresponding member profile to his primary profile, thereby allowing the placeholder ID to be resolved to a primary profile in an actual messaging account 214 (active-type profile). Once the match is detected, the inactive-type and matching active-type profiles are merged, in that one active-type profile replaces the placeholder within the group structure(s) in question.

Figure 3:
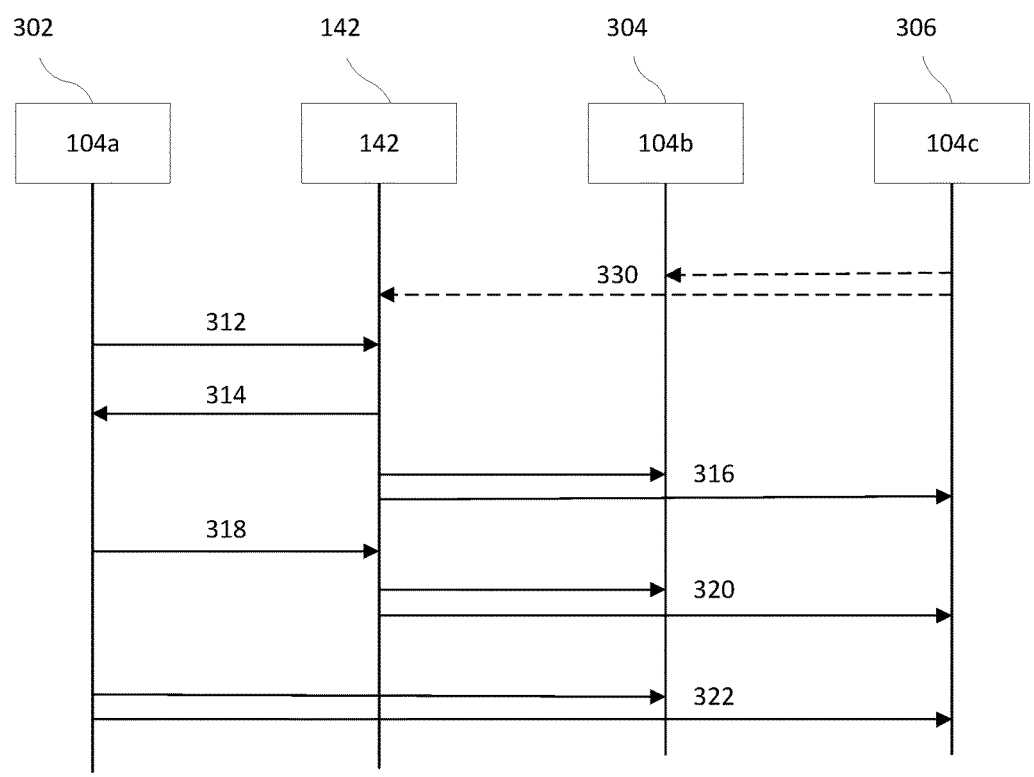
FIG. 3 shows an example message flow according to a hierarchical group structure.

FIG. 3 is message sequence chart illustrating a basic example of instant messaging between a plurality of clients 104a, 104b, 104c and the messaging system 142. Each client

104a, 104b, 104c in this example represents one of the user terminals 104 as shown in and described in relation to FIG. 1.

In the following example, the messaging service 204 is assumed to be implemented by a server of the messaging system 142, though in other cases multiple servers (physical or logical) may implement this functionality collectively. Accordingly, all descriptions pertaining to the server below apply more generally to the messaging service 204 (for example one or more servers of the messaging system 142).

When a sending user logs in, the corresponding client 104a sends (312) to the server connection info such as IP address and port, and contacts information including details of any groups the sending user is a member of, if this is not already stored at the server.

In this example clients 104b and 104c correspond to users who are contacts of the sending client. The server can check which users from amongst the contact information are logged on or online, and can report back (314) to the client 104a. Client 104a can update a display to indicate the status of contacts (e.g. whether they are online or not, or the last time they were logged on or online). The server may notify (316) clients corresponding to the contacts information that client 104a is logged in, and optionally provide the connection information of client 104a.

The sending user wishes to send an IM to a group, which includes clients 104b and 104c. The message is sent (318) to the server. The server can analyse the message to determine the intended recipients, by receiving the name or ID of the group, and looking up members of that group in stored or received contact information and their connection information, and can forward the message appropriately (320).

In the above described method, a hub-spoke architecture is used, with messaged passing between clients via a server, however a peer to peer architecture is a possible alternative. In a peer to peer system, at 314 the server can also provide connection information (e.g. IP address and port) of contacts who are logged in or online (having been notified of such information from the respective clients, shown dashed line as 330). In this way the client 104a is able to send a message directly (322) to clients 104b and 104c, as it has the necessary connection information to access them without the need for a routing intermediary. It is noted that even in a peer to peer session, a server is typically employed to administrate connection information between clients.

Peer to peer architecture is generally more useful for communication where two or more users are connected for a session, such as for a voice call or videoconference for example. A server client, or spoke hub architecture may be more suitable to a text based communication system such as instant messaging.

The above example uses a messaging group arrangement, whereby two or more, or typically three or more users are organised together in a group, having a particular name or identifier. A message can be addressed to the name or identifier of the group, and control logic at the client or server can look up the names and/or addresses of the members of the group, so that the message can be forwarded (i.e. duplicated) to the relevant clients. A messaging group may contain one or more administrators, or admins, who are able to control group properties, such as adding or removing members of the group, or renaming the group for example.

A messaging group may contain one or more groups, in a nested or hierarchical structure, and multiple tiers or hierarchical levels can be established e.g. by a group structure which can support child or sub-groups. A parent group may have more than one child group, however it is also possible for a child group to belong to more than one parent group. Furthermore, an individual user or client can belong to multiple groups, at multiple levels, as required. Therefore, groups may overlap both inter and intra level in some cases. It is also noted that a group may have only other (sub-) groups as members, and no individual members.

For example, a first group ID of a first messaging group may be treated within the messaging system 142 as a member of a second messaging group having a second group ID. That is, an association between the second group ID and the first group ID, such that the first group is defined as a participant of the second group, can be created similarly to how associations between group IDs and member accounts 214 are created for individual users. This makes all participants in the first group (indirect) participants in the second group as well—although as participants are added to or removed from the first group, this is reflected in the second group implicitly without having to change the association between the first and second groups. This provides an efficient and flexible way of managing large and complex group structures in particular. It also simplifies the process of sensing a message across multiple groups.

Figure 4:
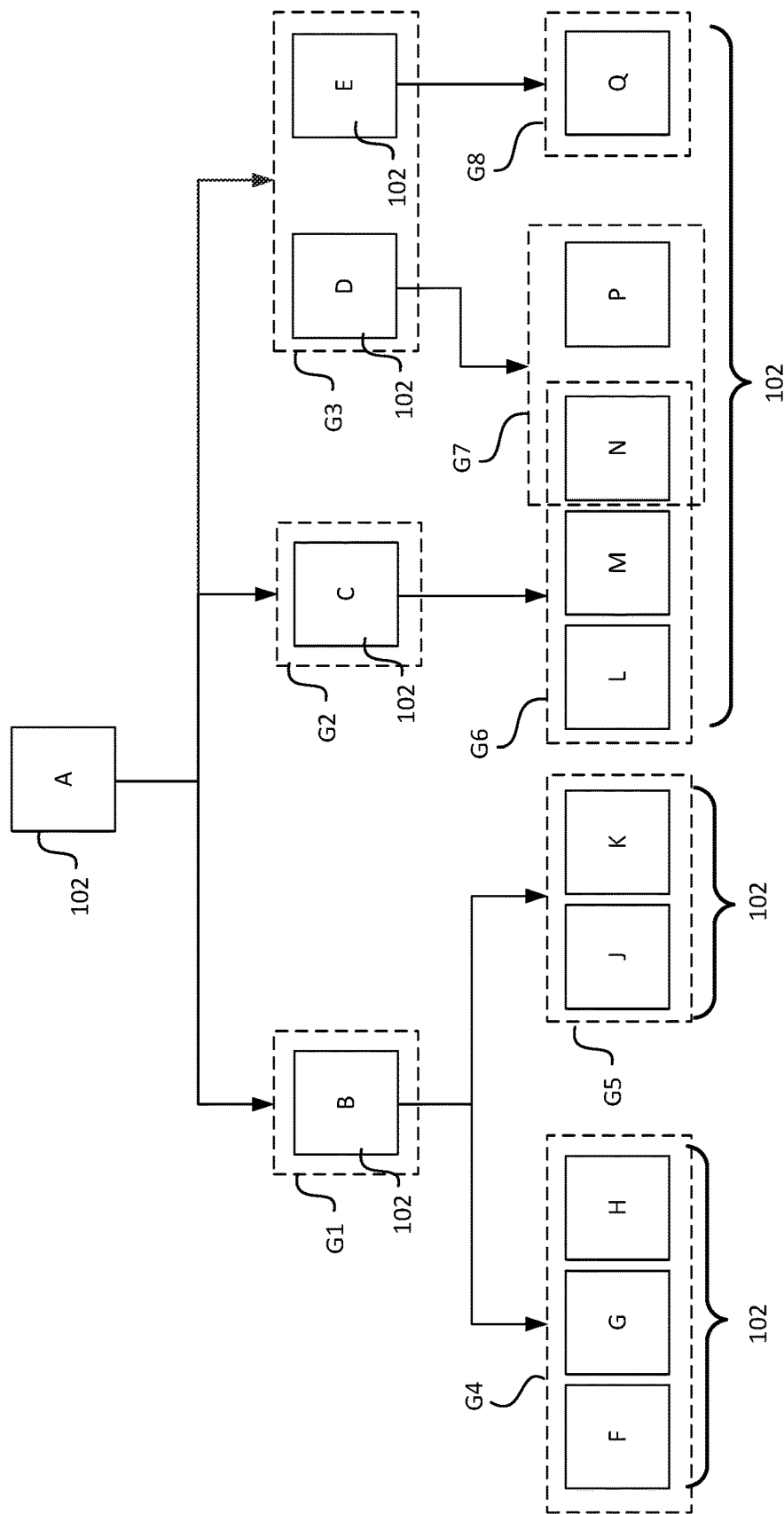
FIG. 4 shows an example of a hierarchical group structure.

An example grouping is shown in FIG. 4 comprising users 102A-Q arranged in groups G1-8. The hierarchical structure is shown with user A (e.g. the CEO of a company using the messaging service) at the top level. A group can contain a single user (e.g. G1 contains user B) or multiple users (e.g. G3 contains user D and user E). Similarly, a single user can belong to more than one group (e.g. user N belongs to both group G6 and group G7). It is understood that this is only an example for the purposes of explanation and that more complicated (and also simpler) group structures are possible. In general, the grouping structure will depend on the specific implementation of the messaging service and the organizational structure of the users using the service.

Figure 5:
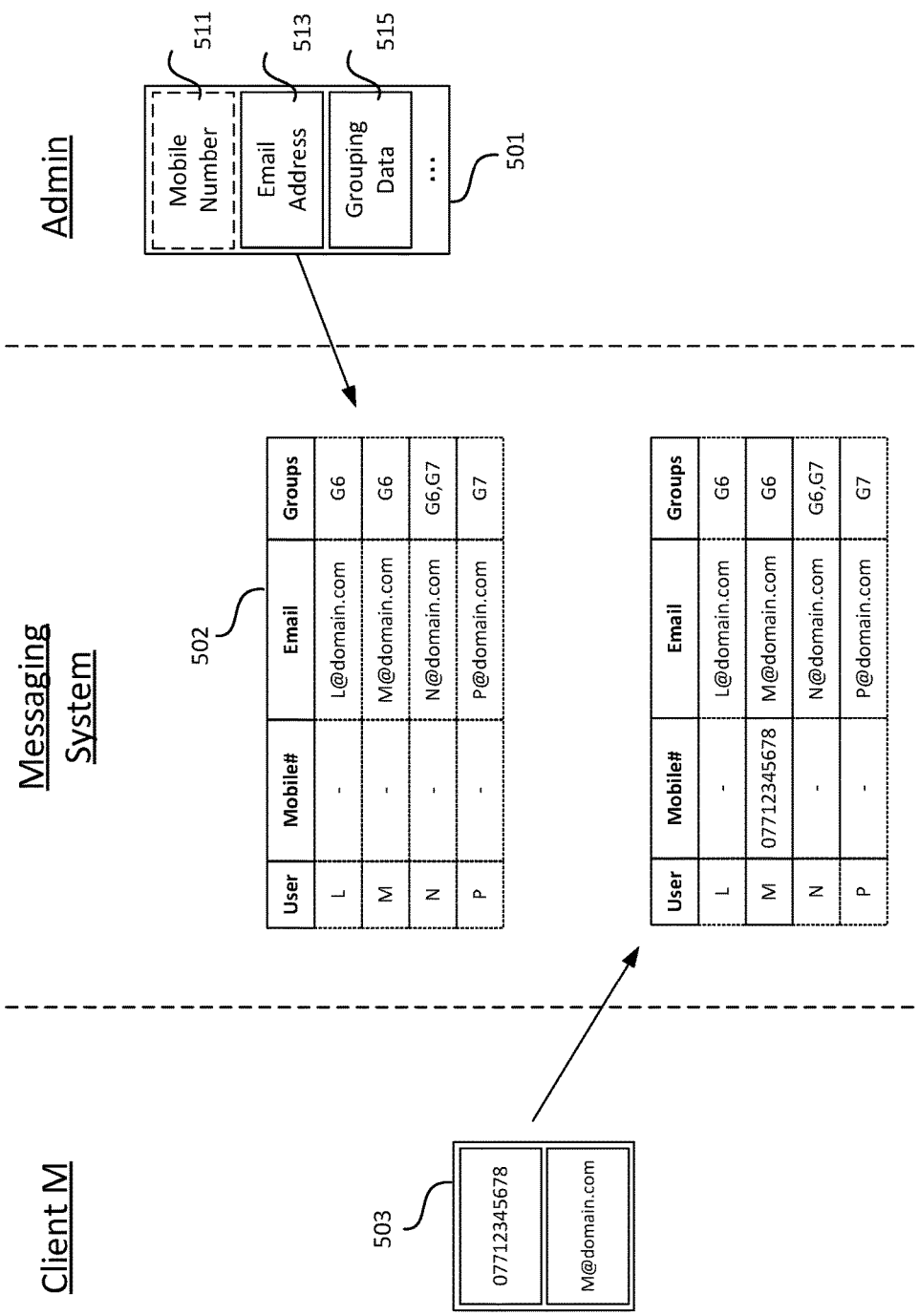
FIG. 5 shows an example of bulk messaging group creation.

FIG. 5 illustrates a simple example of this procedure. At the admin side, the org admin 112 can set up messaging groups by providing "ghost" profile information 501 to the messaging system 142, e.g. using a web portal 202 as described earlier. This information 501 comprises at least secondary ID information 513 such as an email address along with grouping data 515 as shown in FIG. 5 but does not include a primary ID (e.g. mobile number 511) which is used for messaging (as described above). This is illustrated in FIG. 5 as the mobile number is shown with a dotted line to indicate the absence of data (yet).

The messaging system 142 receives data 501 pertaining to multiple clients (only a single generic one is shown in FIG. 5) and constructs ghost profiles and groups as illustrated in table 502. Note that only four users L-P are shown in table 502 for the sake of clarity, and that these correspond to users L-P shown in FIG. 4.

Given the above, it is appreciated that the admin 112 is able to construct the underlying grouping structure without the need of the mobile numbers 551 of any of the clients.

Later, a client (e.g. Client M as shown in FIG. 5) is able to activate his group membership by providing an add-on profile 503 (of the kind described above) to the messaging system 142. This add-on profile 503 specifies at least the mobile number of the user and some identifying information e.g. user name or email as shown in FIG. 5, and comes from the user's member account 224 in this example. The messaging system 142 receives the add-on profile (or at least the required information relating to it) and, upon determining that a ghost profile with an email which matches that of the add-on profile exists, can associate the mobile number of the add-on profile 503 with that account which upgrades the ghost account to an active account which can then be used for messaging. That is, once the add-on profile 503 is added, group information that was saved earlier can be fetched in order to convert the ghost membership into an active one, as the email ID can be used to make the association. In this process, since the primary identity is now available, chat can be initiated. The messaging system 142 can also fetch older messages, with applicable restrictions, sent to the group from earlier points in time.

Note references to software executed on the at least one processor (or similar) can mean all of the software are executed on the same processor, or that portions of the code can be executed on different processors, which may or may not be collocated. For example, in the example architecture of FIGS. 1 to 2, the various services described above can be individually implemented on one or multiple processors, for example embodied in one or more servers; different services can be implemented on the same processor(s)/server(s) or on different processors/servers. In practice, different code portions may be implemented on different processors at different locations, possibly in different data centres which can communicate via the network 108 or a dedicated back-end connection, for example. Note also that "computer storage" refers generally to one or more computer-readable storage devices, such as magnetic or solid-state storage devices. For multiple devices, there may or may not be spatially collocated. For example, different parts of the first/second computer storage 146, 166 may likewise be implemented at different data centres, for example. The system code can be stored for execution at the system in question in one or more computer readable memory devices. The features of the techniques described herein are platform-independent, meaning that the techniques may be implemented on a variety of commercial computing platforms having a variety of processors. For example, the systems may include a computer-readable medium that may be configured to maintain instructions that cause the systems, and more particularly any operating system executed thereon and associated hardware of the system to perform operations. Thus, the instructions function to configure the operating system and associated hardware to perform the operations and in this way result in transformation of the operating system and associated hardware to perform functions. The instructions may be provided by the computer-readable medium to the system processor(s) through a variety of different configurations. One such configuration of a computer-readable medium is a signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A messaging system comprising:
computer storage holding messaging accounts for users of the messaging system, each comprising a user identifier of a first type;
an account manager for managing the messaging accounts;
a group manager configured to grant participant users access to messaging groups by creating, in the computer storage, associations between the messaging groups and the messaging accounts of the participant users;
a group messaging service configured for use in transmitting and receiving messages, in each of the plurality of messaging groups, between the participant users granted access to that messaging group, using the user identifiers of the first type in their messaging accounts;
wherein the group manager is configured to receive group creation data comprising at least one set of user identifiers of a second type denoting a new messaging group to be created, and create in response a new messaging group by storing the set of user identifiers in the computer storage as placeholder identifiers for the new messaging group, the placeholder identifiers lacking a user identifier of the first type;
wherein the account manager is configured to receive, from a user of one of the messaging accounts including a user identifier of the first type, an indication of a user identifier of the second type to be bound to that messaging account, and respond by binding that user identifier of the second type to that messaging account in the computer storage;
wherein the group manager is configured to detect a match between one of the placeholder identifiers and the user identifier of the second type bound to the messaging account, and respond by creating, in the computer storage, an association between that messaging account and the new messaging group, thereby granting the user access to that messaging group, wherein the new messaging group is inaccessible to the user until the user identifier of the second type is bound to his messaging account.

2. A computer system comprising:
a messaging system according to claim 1;
an organization management system comprising: second computer storage holding member accounts for members of an organization, each of the member accounts comprising a user identifier of the second type.

3. The computer system according to claim 2, comprising:
an organization administrator interface configured for use by an administrator of the organization, wherein the group creation database is received by the organization administrator via the organization administrator interface.

4. The computer system according to claim 2, wherein the binding of the user identifier of the second type to the messaging account is conditional on the group manager receiving, from the organization management system, confirmation that the user is an authorized user of one of the member profiles comprising that user identifier of the second type.

5. The computer system according to claim 2, wherein the group creation data defines multiple new messaging groups to be created, wherein multiple new messaging groups are created using placeholder identifiers.

6. The computer system according to claim 2, wherein the first type of user identifiers are phone numbers.

7. The computer system according to claim 2, wherein the second type of user identifiers are email addresses.

8. The computer system according to claim 5, wherein at least one of the placeholder identifiers identifies a participant in a plurality of the new messaging groups, wherein the group manager is configured to detect a match between that placeholder identifier and the user identifier of the second type bound to the messaging account, and respond by creating, in the computer storage, an association between that messaging account and each of the plurality of new messaging groups, thereby granting the user access to all of the plurality of new messaging groups simultaneously.

9. The computer system according to claim 5, wherein the group creation data defines a hierarchical structure for the multiple new messaging groups, in which at least one of the new messaging groups is a participant of at least one other of the messaging groups.

10. A method of managing a messaging system comprising: computer storage holding messaging accounts for users of the messaging system, each comprising a user identifier of a first type; and a group messaging service for use in transmitting and receiving messages, in each of the plurality of messaging groups, between participant users granted access to that messaging group, using the user identifiers of the first type in their messaging accounts; the method comprising steps of:
  granting participant users access to messaging groups by creating, in the computer storage, associations between the messaging groups and the messaging accounts of the participant users;
  receiving group creation data comprising at least one set of user identifiers of a second type denoting a new messaging group to be created;
  creating, in response to receiving said group creation data, a new messaging group by storing the set of user identifiers in the computer storage as placeholder identifiers for the new messaging group, the placeholder identifiers lacking a user identifier of the first type;
  receiving, from a user of one of the messaging accounts including a user identifier of the first type, an indication of a user identifier of the second type to be bound to that messaging account;
  binding, in response to receiving said indication, that user identifier of the second type to that messaging account in the computer storage;
  detecting a match between one of the placeholder identifiers and the user identifier of the second type bound to the messaging account;
  in response to detecting said match, creating, in the computer storage, an association between that messaging account and the new messaging group, thereby granting the user access to that messaging group, wherein the new messaging group is inaccessible to the user until the user identifier of the second type is bound to his messaging account.

11. The method according to claim 10, wherein the messaging system further comprises: an organization management system comprising second computer storage holding member accounts for members of an organization, each of the member accounts comprising a user identifier of the second type.

12. The method according to claim 10, wherein the group creation data defines multiple new messaging groups to be created, wherein multiple new messaging groups are created using placeholder identifiers.

13. The method according to claim 10, wherein the first type of user identifiers are phone numbers.

14. The method according to claim 10, wherein the second type of user identifiers are email addresses.

15. The method according to claim 11, wherein the messaging system further comprises: an organization administrator interface configured for use by an administrator of the organization, wherein the group creation database is received by the organization administrator via the organization administrator interface.

16. The method according to claim 11, wherein the binding of the user identifier of the second type to the messaging account is conditional on receiving, from the organization management system, confirmation that the user is an authorized user of one of the member profiles comprising that user identifier of the second type.

17. The method according to claim 12, wherein at least one of the placeholder identifiers identifies a participant in a plurality of the new messaging groups, wherein the method further comprises: detecting a match between that placeholder identifier and the user identifier of the second type bound to the messaging account, and respond by creating, in the computer storage, an association between that messaging account and each of the plurality of new messaging groups, thereby granting the user access to all of the plurality of new messaging groups simultaneously.

18. The method according to claim 12, wherein the group creation data defines a hierarchical structure for the multiple new messaging groups, in which at least one of the new messaging groups is a participant of at least one other of the messaging groups.

19. A computer program product for managing a messaging system comprising: computer storage holding messaging accounts for users of the messaging system, each comprising a user identifier of a first type; and a group messaging service for use in transmitting and receiving messages, in each of the plurality of messaging groups, between participant users granted access to that messaging group, using the user identifiers of the first type in their messaging account; the computer program product comprising computer-executable code embodied on a computer-readable storage medium configured to as when executed by one or more processing units to perform steps of:
  granting participant users access to messaging groups by creating, in the computer storage, associations between the messaging groups and the messaging accounts of the participant users;
  receiving group creation data comprising at least one set of user identifiers of a second type denoting a new messaging group to be created;
  creating, in response to receiving said group creation data, a new messaging group by storing the set of user identifiers in the computer storage as placeholder identifiers for the new messaging group, the placeholder identifiers lacking a user identifier of the first type;
  receiving, from a user of one of the messaging accounts including a user identifier of the first type, an indication of a user identifier of the second type to be bound to that messaging account;
  binding, in response to receiving said indication, that user identifier of the second type to that messaging account in the computer storage;
  detecting a match between one of the placeholder identifiers and the user identifier of the second type bound to the messaging account;
  in response to detecting said match, creating, in the computer storage, an association between that messaging account and the new messaging group, thereby granting the user access to that messaging group, wherein the new messaging group is inaccessible to the user until the user identifier of the second type is bound to his messaging account.

20. The method according to claim 19, wherein the messaging system further comprises: an organization management system comprising second computer storage holding member accounts for members of an organization, each of the member accounts comprising a user identifier of the second type.

\* \* \* \* \*